Nov. 25, 1969   SUSUMU FUKUDA   3,480,354
AUTOMATIC MAGAZINE CHANGING TYPE PROJECTOR WITH
AUTOMATIC REWINDING MEANS
Filed Aug. 22, 1967

INVENTOR
SUSUMU FUKUDA

BY *Sughrue, Rothwell, Mion, Zinn & Macpeak*

ATTORNEYS

United States Patent Office 3,480,354
Patented Nov. 25, 1969

3,480,354
AUTOMATIC MAGAZINE CHANGING TYPE PROJECTOR WITH AUTOMATIC REWINDING MEANS
Susumu Fukuda, Nishinomiya-shi, Japan, assignor to Fuji Shashin Film Kabushiki Kaisha, Ashigara-Kamigun, Kanagawa, Japan
Filed Aug. 22, 1967, Ser. No. 662,377
Claims priority, application Japan, Aug. 30, 1966, 41/57,142
Int. Cl. G03b 21/02
U.S. Cl. 352—123        2 Claims

ABSTRACT OF THE DISCLOSURE

A motion picture projector of the type utilizing film magazines is provided with automatic magazine changing and automatic reel rewinding mechanisms. A projector body has an elongated housing which mounts a movable magazine loading frame for movement transversely past a protruding portion of the body. The magazines may be fed one at a time from the loading frame to the protruding portion where a film drive and projection system cooperate with the magazine. After projection the take-up reels of all the magazines in the magazine loading frames are rewound simultaneously by a friction rewind mechanism. A friction drive mechanism is utilized to move each magazine serially from the magazine loading frame into the protruding portion of the projector housing.

BACKGROUND OF THE INVENTION

This invention relates to improvements in motion picture projectors, particularly projectors of the type utilizing film cartridges having a film supply and take-up reel within each cartridge.

In the known movie projectors using film magazines or cartridges, handling of the film is greatly simplified and operation of the projector accordingly simplified. However, the problem of rewinding the film within each cartridge is still present and the time of rewinding is taken from the time available for projecting the motion picture. Furthermore, in the known movie projectors of this type, the projection mechanism and sound reproducing mechanism is involved during the rewinding.

This invention provides a unique construction of a motion picture projector having automatic magazine changing and automatic reel rewinding means in which magazines may be fed one at a time from a magazine loading rack into a protruding portion of the housing for projecting the film by a known projection system and then after all the films are projected, the films will be on the take-up reel within each magazine and can be rewound onto the supply reel within each magazine simultaneously by friction rollers on a movable rewind shaft.

DESCRIPTION OF DRAWING

The invention will be readily understood from the following description taken in connection with the accompanying drawing in which.

DESCRIPTION OF PREFERRED EMBODIMENT

Figure 1:
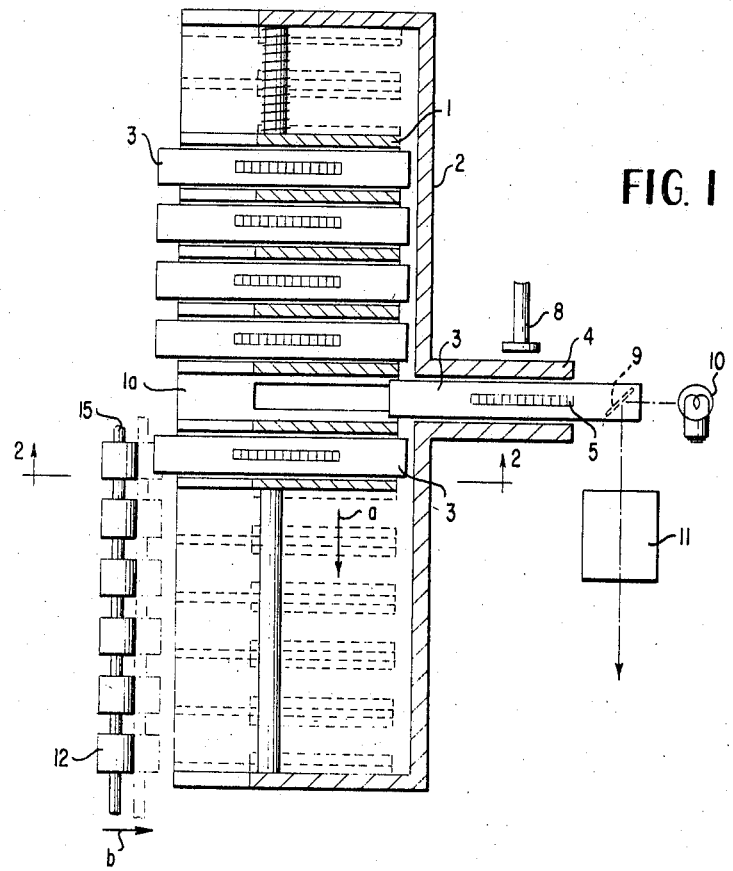
FIG. 1 is a sectional top plan view with portions shown diagrammatically of a projector according to a preferred embodiment of this invention.

As shown in the drawing, a motion picture projector includes a magazine loading frame 1 having a plurality of magazine loading chambers 1a slidably mounted for movement within an elongated projector body housing 2. Projector body housing is provided with a protruding portion 4 opening transversely thereof and of such a width to receive a magazine 3 in position for projecting the film in the magazine.

Figure 2:
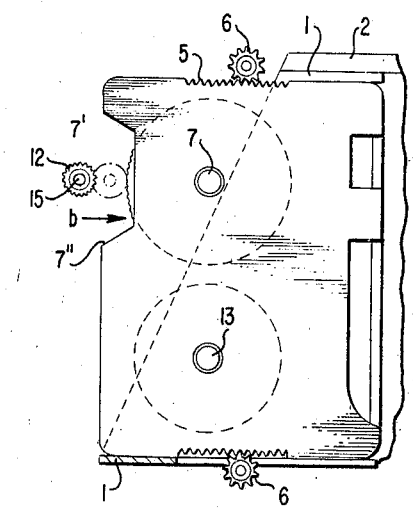
FIG. 2 is a sectional side elevation view taken along line 2—2 of FIG. 1.

In the magazine a film supply reel is positioned in the upper part of the housing and a film take-up reel in the lower part of the magazine housing. The film supply reel 7 has knurled portions 7' on the outer periphery of its flanges and these are exposed at the rear of the magazine through an opening 7" as shown in FIG. 2.

The magazine loading frame 1 is movable in the direction of the arrow a, FIG. 1, by the width of one chamber at a time. The first magazine 3 is inserted into the protruding portion 4 from the magazine loading frame 1 by the cooperation of gears or friction rollers 6, FIG. 2, with racks or knurled portions 5 in the top and bottom of the magazine housing.

When the magazine 3 is inserted into the protruding portion 4 of the projector housing, a winding and clutched drive mechanism 8 is meshed with a protrusion of shaft 13 on the take-up reel within the magazine.

Motion pictures are projected from the film by means of a lamp 10 and a reflecting mirror 9 which is disposed as the projecting film surface in the magazine is between the lamp 10 and mirror 9 and a projecting lens system 11.

After the film in magazine 3 is wound from the supply reel 7 onto the take-up reel and the projection has finished, the gears 6 return the magazine from protruding portion 4 into the magazine loading rack 1 and the magazine loading frame is moved the width of one loading chamber so that the next magazine can be loaded into position to be operated by the projector. The previously projected film is wound on the take-up reel and, of course, needs to be rewound on the supply reel. However, both ends of the film are secured to the shaft of the film supply and rewinding reels so they do not become disconnected when the projection is finished.

After projection of all of the films in each of the magazines 3 has been completed the frame 1 has moved to the bottom portion of FIG. 1 and rubber rewinding rollers frictionally attached to shaft 15 are moved bodily by moving the shaft 15 in the direction of the arrow b, so that the periphery of the rollers contacts the knurled periphery 7' of the supply reel within each of the magazines simultaneously. Shaft 15 is rotated enough revolutions so that all of the film strip is rewound from the take-up onto the supply reel. However, the end of the film is attached to the take-up reel and there is a friction drive between shaft 15 and roller 12 so that no harm is done if rollers 12 rotate after all of the film has been taken up onto the supply reel. After a predetermined number of revolutions, the shaft 15 is moved back to its full line position shown in FIGS. 1 and 2, opposite the direction of arrow b, so as not to obstruct the magazine loading frame 1 when it is moved back to its original start position on the opposite side of protruding portion 4 and oppositely to the direction of arrow a.

The frictional connection between the rubber rollers 12 and the shaft 15 is such that the rollers will slip on the shaft by the tension of the film after the film is rewound. After the magazine loading frame 1 is returned to its original position, the magazines 3 may be removed from the magazine loading chambers 1a.

It can, therefore, be seen that in the projector of the present invention the rewinding mechanism is distinct and apart from the projection mechanism and sound reproducing mechanism. With this arrangement, each mechanism may be separately handled and may be more simple. More important, it is possible to successively project each magazine without any lost time for rewinding, which would normally be carried out after the projection of the film in each magazine. Moreover, when the film in each magazine is rewound, they are rewound simultaneously and the time for rewinding all of the film on all of the magazines is the same as the time for rewinding the film in one magazine.

While the invention has been particularly shown and described with reference to a preferred embodiment thereof, it will be understood by those skilled in the art that various changes in form and details may be made therein without departing from the spirit and scope of the invention.

What is claimed is:

1. A motion picture projector including automatic magazine changing and automatic reel rewinding means comprising; a projector body including an elongated housing with a protruded portion opening transversely thereof for receiving a film magazine therein, the film magazine having a supply reel and a take-up reel, a film drive means and an optical projection system for driving the film in the magazine positioned in the protruding portion of the housing and projecting the image on the film, a magazine loading frame with a plurality of magazine loading chambers movable within the projector housing transversely of the protruding portion from one side thereof to the other and carrying a plurality of film magazines, and a rewinding shaft having friction rollers frictionally carried thereon, the rewinding shaft movable toward and away from the elongated housing on one side thereof from the protruding portion to contact the periphery of supply reels within the magazine to rewind the film in all of the magazines simultaneously.

2. A motion picture projector as in claim 1 further comprising, rollers above and below the protruding portion of the projector cooperating with the top and bottom portion of the magazine in the magazine frame for moving the magazine from the magazine loading frame into the protruding portion of the housing for projection.

References Cited

UNITED STATES PATENTS

| | | |
|---|---|---|
| 2,196,730 | 4/1940 | Hooker. |
| 2,755,030 | 7/1956 | D'Ornellas. |
| 3,262,357 | 7/1966 | Warzynski et al. _____ 352—123 |

JULIA E. CORNER, Primary Examiner

U.S. Cl. X.R.

352—124